May 6, 1958     H. F. LEVY     2,833,435
MATERIALS-HANDLING VEHICLE
Filed Feb. 26, 1957     3 Sheets-Sheet 2
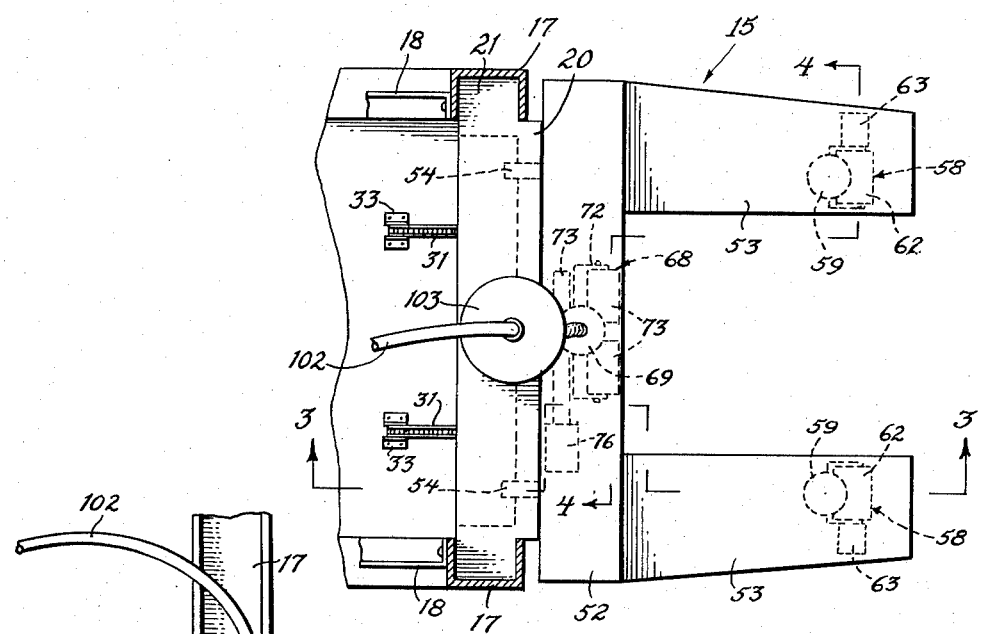
Fig. 2.
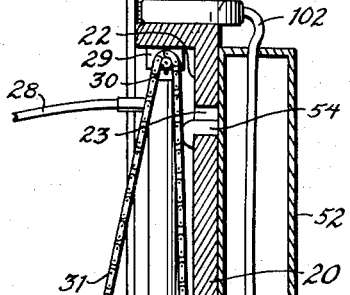
Fig. 3.
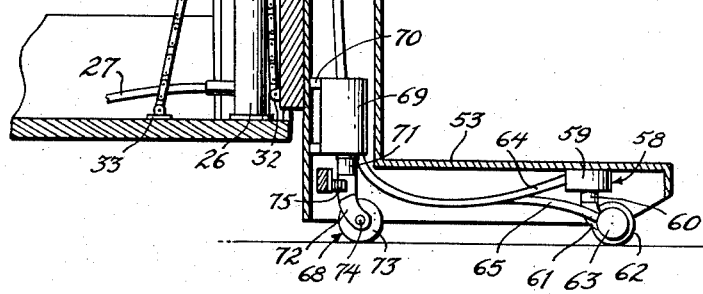
INVENTOR.
HANS F. LEVY
BY
ATTORNEY.

May 6, 1958 H. F. LEVY 2,833,435
MATERIALS-HANDLING VEHICLE
Filed Feb. 26, 1957 3 Sheets-Sheet 3

INVENTOR.
HANS F. LEVY
BY
ATTORNEY.

United States Patent Office 2,833,435
Patented May 6, 1958

2,833,435

MATERIALS-HANDLING VEHICLE

Hans F. Levy, Haddon Township, Camden County, N. J., assignor of one-half to Robert K. Youtie, Haddon Township, Camden County, N. J.

Application February 26, 1957, Serial No. 642,497

6 Claims. (Cl. 214—515)

This invention relates generally to transportation apparatus, and is particularly concerned with materials-handling vehicles of the general type disclosed in my copending patent application Serial No. 599,425, filed July 23, 1956, of which this application is a continuation in part.

As is well known to those versed in the art of materials handling, the use of conventional lift trucks in the loading and unloading of van-type vehicles requires that a lift truck run onto the van from a platform or loading dock, or that a relatively long inclined ramp be employed. Frequently loading docks or ramps are not available when needed, so that one or more trucks and their personnel may be kept waiting in idleness, which, of course, produces costly delay and congestion.

As the floor or bed of a van body cannot ordinarily be maintained at the same elevation during loading or unloading, due to the yieldable van wheel mounts, and as van beds are not constructed to any standard elevation, docks or platforms often differ considerably in elevation from the bed of a van, so that the movement of a lift truck between the loading dock and van floor is difficult if not impossible. While there have recently been provided elevator platforms or loading docks adapted to compensate for various van bed levels, these devices are extremely expensive and unreliable in use; and further, such devices often require stagewise transfer of loads between the van bed, platform and adjacent ground surface.

Another disadvantage arising in the use of conventional lift trucks is that such trucks are often incapable of entering into a covered van, and usually require a somewhat dangerous and time-consuming backing-up procedure in withdrawing from the van. Of course, the loads adapted to be placed on or removed from a van by a conventional lift truck are determined by the counterbalancing of the latter, so that a separate trip into the van must usually be made for each palletized load, which must be of less than a predetermined maximum weight.

It is a general object of the present invention to provide materials-handling apparatus which overcomes all of the above-mentioned disadvantages, and wherein a single device of the present invention is capable of performing all the operations necessary to completely load and unload a van, including delivering materials to or obtaining materials directly from any desired location, such as a warehouse or the like, all without even entering the van and without the use of any type of platform, dock, ramp, or the like. Obviously, this is highly advantageous in that van loading and unloading operations are not limited to the number of available docks, or to the space available for ramps, do not depend upon the reliability of elevator platforms or similar complex devices, and may be accomplished with considerable savings in time and labor.

Moreover, as the materials-handling device of the present invention eliminates the necessity for a lift truck entering a van during loading and unloading of the latter, the necessity for backing-out of the van is obviated, which serves to increase both the speed and safety of the procedure.

It is a further object of the present invention to provide a materials-handling device having the advantageous characteristics mentioned in the foregoing paragraphs, which is capable of carrying a load of relatively great weight into and out of a van, the weight of load being limited only by the load-carrying capacity of the van floor. Stated otherwise, the materials-handling device of the present invention is adapted to move any number of stacked palletized loads into and out of a van without the necessity for considering the counterbalancing of the handling device as the total load is entirely supported by the floor of the van.

In addition, the present invention contemplates the provision of a device which may be of considerably less weight than the device of my above-mentioned copending patent application, and which may also be employed in a greater variety of tasks, such as those wherein a load to be removed from a van is not located in front of the van opening or door, so that the handling device must "turn a corner," so to speak. This feature may be found highly advantageous in the loading and unloading of railroad box cars.

It is still another object of the present invention to provide an improved lift truck having the novel and advantageous features mentioned in the foregoing paragraphs, which is extremely simple in construction and operation, durable in use, and which can be manufactured and maintained at a reasonable cost.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

Fig. 2 is a partial horizontal sectional view taken substantially along the line 2—2 of Fig. 1;

Fig. 3 is a sectional elevational view taken substantially along the line 3—3 of Fig. 2;

Figure 1:
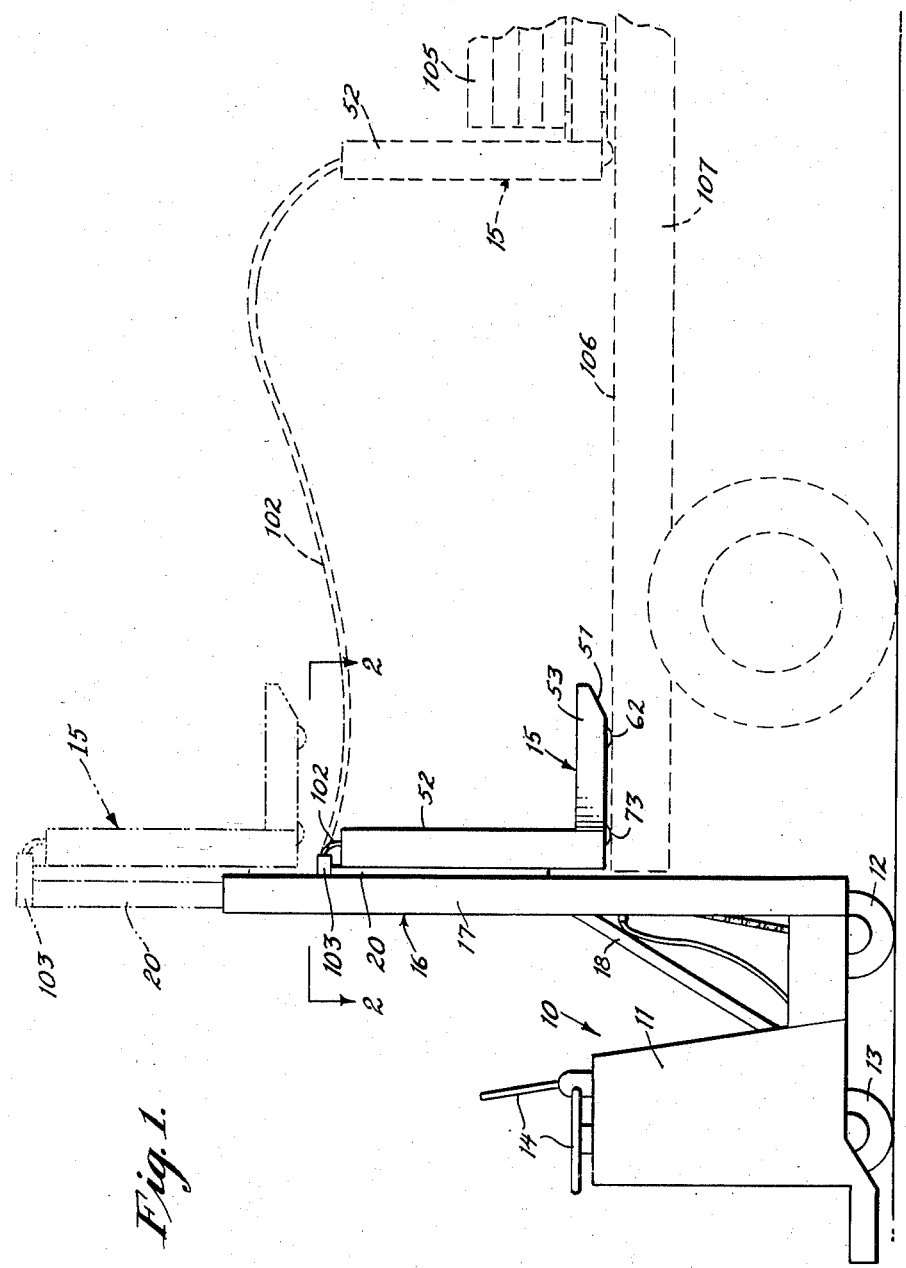
Fig. 1 is a side elevational view showing a lift truck constructed in accordance with the present invention, and illustrating various operative conditions of the device in dashed, and dot-and-dashed outline.

Referring now more particularly to the drawings, and specifically to Fig. 1 thereof, the embodiment of the invention illustrated therein comprises a master wheeled vehicle or mobile truck, generally designated 10, which includes a body 11 supported for movement along a ground surface by front wheels 12 and rear wheels 13. The wheels 12 and 13 may be provided with any suitable power or drive means, as desired; and, the front wheels may be dirigibly mounted by any suitable means. Arranged conveniently for manipulation by the driver are operating handles 14. Mounted on the forward end of and projecting generally forward from the master vehicle 10 is a load-supporting, auxiliary vehicle, generally designated 15.

More particularly, a generally upright track 16, which may consist of a pair of laterally spaced facing channels 17, see Figs. 2 and 3, are fixed on the forward end of vehicle body 11, and there braced by inclined members 18. A generally vertically disposed, platelike mounting member or carriage 20 extends between and has opposite side portions 21 slidably received in respective channels 17, so that the mounting member 20 is constrained to generally vertical movement in the track channels 17. As best seen in Fig. 3, the mounting member 20 is preferably rearwardly hollowed, as at 22, and provided with a pair of laterally spaced, forwardly and rearwardly opening through holes 23.

A generally vertically disposed fluid cylinder 26 is fixed at its lower end on the forward region of vehicle body 11, advantageously located within the recess 22 of mounting member 20, see Fig. 3, and preferably provided adjacent to its lower and upper ends with fluid conduits 27 and 28. A conventional piston (obscured in the drawings) is provided within the cylinder 26, and includes a piston rod 29 projecting outward through the upper cylinder end interiorly of the mounting-member cavity or recess 22. Also disposed within the cavity 22, on opposite sides of and rotatably carried by the projecting upper end of the piston rod 29, are a pair of sprocket wheels 30. A chain 31 is trained over each sprocket wheel 30, having one end connected, as at 32, to a lower region of the mounting member 20, and having its other end anchored, as at 33, to the vehicle body 11. The conduits 27 and 28 are connected by suitable valve means (not shown) to a source of fluid under pressure, so that selective operation of the valve means will effect a vertical displacement of the piston within the cylinder 26 for moving the sprocket wheels 30 to any desired vertical location. Of course, vertical movement of the sprocket wheels effects vertical sliding movement of the carriage or mounting member 20 in the track 16 by the chain connections 31.

The load-carrying element or auxiliary vehicle 15, as best seen in Figs. 1 and 3, includes a generally vertically disposed, hollow and downwardly opening back member 52, and a pair of laterally spaced, hollow and downwardly opening forks or platform members 53, each extending forwardly or generally horizontally forward from the lower region of the back member. The underside of the forward region of each fork is preferably inclined forward, as at 51. On the rearward side of the back member are arranged a pair of laterally spaced, rearwardly projecting, downwardly opening rigid hooks 54 for releasable interlocking engagement with the carriage 20 through the carriage openings 23, as will appear more fully hereinafter.

On the other side of each fork 53, in the forward region thereof, are mounted wheel structures or running gear, each generally designated 58, and including a cylinder 59 fixedly secured in generally vertical disposition on the undersurface of the respective fork, and a piston rod 60 projecting downward from the respective cylinder and mounted therein for limited vertical movement. On the lower end of each piston rod 60 is fixed a wheel-carrying structure or caster 61, in which is journaled or rotatably carried a wheel or roller 62. Motive means, such as a hydraulic motor 63, may be carried by each caster 61 in driving connection with the adjacent roller 62. As the running gear 58 in both of the load-supporting-element forks 53 are substantially identical, a description of one will suffice. Fluid lines or conduits 64 and 65 are connected to each cylinder 59 and motor 63 to effect vertical movement of the piston rods 60 in their respective cylinders, and rotary driving operation of the motors.

In the hollow lower interior region of the back member 52 of the auxiliary vehicle 15 is mounted additional running gear, generally designated 68, and including a generally vertically disposed cylinder 69 fixedly secured, as by bracket 70, in vertical disposition within the lower interior region of the back member 52. A piston rod 71 is mounted internally within the cylinder 69, and depends vertically from the lower cylinder end for limited vertical movement relative to the cylinder. A wheel-supporting yoke or caster 72 is fixed on the lower end of the piston rod 71; and, a pair of spaced, aligned wheels or rollers 73 are mounted in the caster 72 for free rotation about a journal shaft 74 carried by the caster. Thus, the rollers 73 are rotatable relative to each other.

Figure 4:
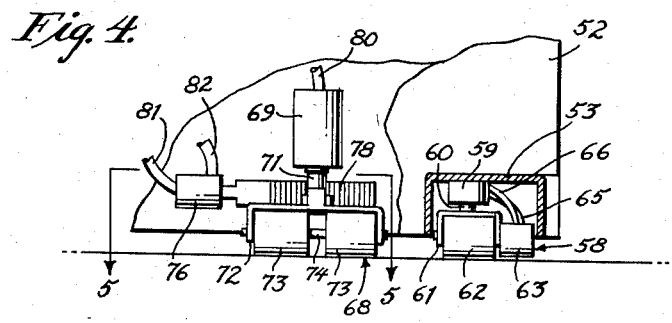
Fig. 4 is a partial elevational sectional view taken substantially along the line 4—4 of Fig. 2.
Figure 5:
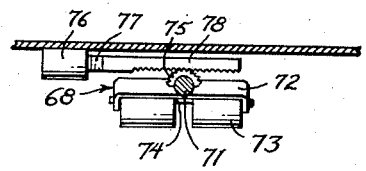
Fig. 5 is a partial horizontal sectional view taken subtially along the line 5—5 of Fig. 4.

Further, the piston rod 71 is mounted in the cylinder 69 for rotative movement about the generally vertical axis of the cylinder, and is provided on its lower region with an arcuate toothed segment or partial gear 75. A generally horizontally disposed cylinder 76, see Figs. 4 and 5, is fixedly secured interiorly of the back member 52 in the lower region thereof, laterally spaced from the centrally located cylinder 69. A generally horizontally disposed piston rod 77 is mounted in the cylinder 76 for horizontal reciprocation, and is provided on its external end with an elongated toothed member or rack 78 having teeth in meshing engagement with the toothed segments 75 of the piston rod 71. Thus, upon shifting of the piston rod 77 in its cylinder 76, the rack 78 and segments 75 will interact to effect rotation of the vertical piston rod 71 and thereby steer the running gear 68. As best seen in Fig. 4, the cylinder 69 is provided with a fluid conduit 80, while the piston 76 is provided with a pair of fluid conduits 81 and 82. Also seen in Fig. 4 is that the hydraulic motors 63 are each provided with a pair of fluid lines or conduits 65 and 66.

Figure 6:
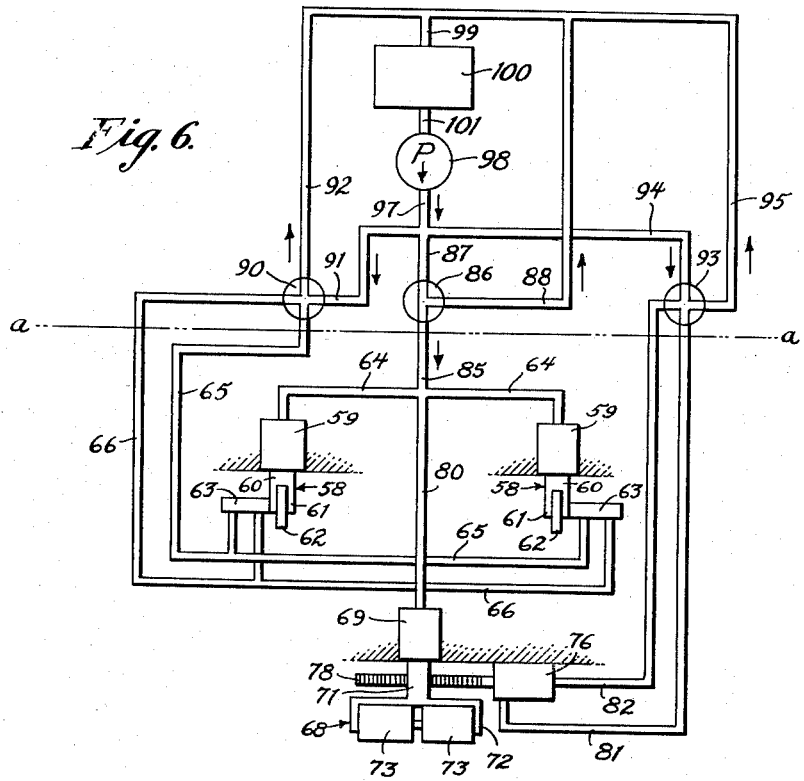
Fig. 6 is a schematic illustration showing a hydraulic system adapted for use in the device of the present invention.

In Fig. 6, the schematic diagram of the hydraulic system, it will be noted that cylinder-operating lines 64 and 80 merge in a single line or fluid conduit 85, which is connected through a three-way valve 86 to inlet conduit or line 87 and outlet conduit or line 88. The hydraulic motors 63 have their operating-fluid lines 65 and 66 connected through a four-way valve 90 to an inlet conduit or line 91 and an outlet conduit or line 92, while the steering cylinder 76 has its operating lines 81 and 82 connected through a four-way valve 93 to an inlet conduit or line 94 and an outlet conduit or line 95. The valves 86, 90, and 93 may all be of the type having an all-ports-closed position, and may be solenoid operated, if desired. It will be noted that all of the inlet lines 91, 87, and 94 connect or merge with a single inlet line or conduit 97, which is connected to a pump 98, while all of the outlet lines 92, 88, and 95 merge or connect with a single outlet line or conduit 99 which is connected to a tank or reservoir 100. The tank or reservoir 100 is connected by a fluid conduit or line 101 to the pump 98 to complete the circuit.

For practical purposes, the lines 66, 65, 85, 82, and 81, as crossed by the dot-and-dash line $aa$, may be combined in the form of a single, multipassageway line, as at 102 in Figs. 1–3. It will be noted in Figs. 2 and 3 that a reel or coil 103 is mounted on the carriage 20 and receives the line 102 coiled thereabout. Thus, the reel 103 operates to automatically retract and extend the multipassageway conduit 102 upon movement of the auxiliary vehicle 15 toward and away from the master vehicle 11.

In operation, the device of the present invention may be employed in the same manner as a conventional fork truck, if desired. That is, with the hooks 54 interengaged through the carriage openings 23, the auxiliary vehicle 15 is rigidly secured to the carriage or elevator 20 for up-and-down movement with the latter. While the weight of auxiliary vehicle 15 is sufficient to maintain the hooks 54 in interlocked relation with respect to the elevator carriage 20, additional locking means may be provided for this purpose, if desired.

When it is desired to remove a palleted load 105 from the generally horizontal bed surface 106 of a truck 107, see Fig. 1, the carriage 20 is elevated, carrying the auxiliary vehicle 15 with the carriage, so as to place the auxiliary vehicle 15 on the truck bed 106, as in the solid-line position. More specifically, the auxiliary vehicle 15 may be elevated above the level of the truck bed 106, and the master vehicle 10 driven to place the auxiliary vehicle over the truck bed. The elevator carriage 20 is then lowered until the running gear 58 and 68 of the auxiliary vehicle rests on the truck bed, the condition of Figure 3. The elevator carriage may then be further lowered with the auxiliary vehicle 15 resting on the truck bed, so as to raise the interlocking hooks 54 in their carriage openings 23; or, with the auxiliary vehicle resting on the truck bed, the cylinders 59 and 69 may be actuated to shift their respective piston rods 60 and 71 downward, and thereby elevate the auxiliary vehicle and its hooks 54 in the openings 23. By either procedure, the hooks 54 will be aligned with their respective openings 23 for withdrawal therefrom upon forward independent movement of the auxiliary vehicle 15 away from the elevator carriage 20. This forward independent movement of the auxiliary vehicle is effected by energization of the motors 63 to drive the roller 62 of the running gear 58.

The auxiliary vehicle 15 may thus be driven toward the load 105, and if necessary the rear running gear 68 may be turned by actuation of the piston 76 to properly direct the auxiliary vehicle into position beneath the load. The auxiliary vehicle is then elevated by actuation of the piston rods 60 and 71 in their respective cylinders 59 and 69 to raise the load from the bed 106 of the truck 107. This elevation of the auxiliary vehicle is, of course, effected by actuation of the valve 86.

Energization of the auxiliary vehicle drive motor 63 may then be reversed, by proper operation of the valve 90, and the dirigible running gear 68 steered as required by proper operation of the valve 93, to return the auxiliary vehicle to the elevator carriage 20 with hooks 54 engaged through the openings 23. Interlocking engagement of the hooks 54 in their openings 23 may be effected by operation of the valve 86 to permit lowering of the auxiliary vehicle 15, or by elevation of the elevator carriage; and, the entire device may subsequently be employed as a conventional fork truck for conveying the load wherever desired.

From the foregoing, it is seen that the present invention provides a load-handling apparatus which fully accomplishes its intended objects, and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. Load-carrying apparatus comprising a master mobile vehicle, elevator means mounted on said vehicle for movement with said vehicle and up-and-down movement relative to said vehicle, an auxiliary mobile vehicle removably carried by said elevator means for movement therewith and movement independent thereof along a supporting surface, said auxiliary vehicle thus being movable along a supporting surface independently of said master vehicle toward and away from a load on said supporting surface, means on said auxiliary vehicle for raising said load from said supporting surface and lowering said load to said supporting surface, power means associated with said master vehicle, auxiliary vehicle, and elevator means, and control means on said master vehicle for controlling said power means, whereby said auxiliary vehicle is adapted to carry said load along said supporting surface and movable with said elevator means to raise and lower said load.

2. Load-carrying apparatus according to claim 1, in combination with dirigible running gear on said auxiliary vehicle, power means associated with said dirigible running gear, and means on said master vehicle for controlling said last-named power means, whereby said auxiliary vehicle is movable in various directions along a supporting surface.

3. Load-handling apparatus comprising a carrier vehicle, an elevator mounted on said carrier vehicle for movement therewith and up-and-down movement relative thereto, a load-supporting vehicle movable along a supporting surface into and out of position beneath a load on said supporting surface, powered means on said load-supporting vehicle to raise the latter and lift said load from said supporting surface and lower said supporting vehicle to return said load to said supporting surface, means on said carrier vehicle for controlling said powered means, and means removably mounting said load-supporting vehicle on said elevator for movement therewith, whereby said load-supporting vehicle is adapted to carry a load along said supporting surface and is adapted to be raised and lowered by said elevator and carried by said carrier vehicle.

4. Load-carrying apparatus comprising a master mobile vehicle, elevator means mounted on said vehicle for movement with said vehicle and up-and-down movement relative to said vehicle, an auxiliary mobile vehicle releasably carried by said elevator means for movement therewith and movement independent thereof along a supporting surface, said auxiliary vehicle thus being movable along a supporting surface independently of said master vehicle toward and away from a load on said supporting surface, means on said auxiliary vehicle for raising said load from said supporting suface and lowering said load to said supporting surface, independent power means operatively associated with each of said master vehicle, elevator means and said auxiliary vehicle, to thereby independently power said elevator means for up-and-down movement and said vehicles for movement along said supporting surfaces, and control means on said master vehicle for controlling each of said power means, whereby said auxiliary vehicle is adapted to carry said load along said supporting surface and movable with said elevator means to raise and lower said load.

5. In an attachment for a master mobile vehicle having elevator means and power means, the combination comprising: an auxiliary mobile vehicle adapted to be removably carried by the elevator means of said master mobile vehicle for movement with the latter and movable independently of the latter along a supporting surface, means on said auxiliary vehicle for raising a load from said supporting surface and lowering said load to said supporting surface, said auxiliary mobile vehicle and said load-raising-and-lowering means on said auxiliary vehicle being adapted for connection to the power means of said master mobile vehicle to be powered thereby, and control means adapted to be located on said master vehicle for controlling the powering of said auxiliary vehicle and said load-raising-and-lowering means on said auxiliary vehicle.

6. The combination according to claim 5, in combination with dirigible running gear on said auxiliary vehicle, said running gear being adapted for connection to the power means of said master mobile vehicle to be steered thereby, and control means adapted to be located on said master vehicle for controlling the powered steering of said dirigible running gear.

References Cited in the file of this patent

UNITED STATES PATENTS

| | | |
|---|---|---|
| 1,407,120 | Wyman | Feb. 21, 1922 |
| 2,647,647 | Alimanestiano | Aug. 4, 1953 |
| 2,796,186 | Arnot | June 18, 1957 |